United States Patent [19]

Buckler

[11] Patent Number: 5,328,194

[45] Date of Patent: Jul. 12, 1994

[54] SEMI-RECUMBENT BICYCLE WITH ITEM STORAGE COMPARTMENT

[76] Inventor: Clive E. Buckler, N. 2607 Magnolia St., Spokane, Wash. 99207

[21] Appl. No.: 915,521

[22] Filed: Jul. 20, 1992

[51] Int. Cl.$^5$ ............................................. B62J 7/02
[52] U.S. Cl. ............................. 280/202; 280/288.1; 280/288.3
[58] Field of Search ............ 280/202, 274, 281.1, 280/288.1, 288.3

[56] References Cited

U.S. PATENT DOCUMENTS

| | | | |
|---|---|---|---|
| 2,482,472 | 9/1949 | Fried | 280/261 |
| 4,333,664 | 6/1982 | Turner et al. | 280/261 |
| 4,368,897 | 1/1983 | Brown | 280/202 |
| 4,592,563 | 6/1986 | Dean et al. | 280/253 |
| 4,659,098 | 4/1987 | Jacobson | 280/288.1 |
| 4,925,203 | 5/1990 | Buckler | 280/278 |

FOREIGN PATENT DOCUMENTS

| | | | |
|---|---|---|---|
| 882652 | 7/1953 | Fed. Rep. of Germany | 280/288.3 |
| 286409 | 2/1965 | Netherlands | |
| 6748 | of 1896 | United Kingdom | |

Primary Examiner—David M. Mitchell
Assistant Examiner—Andrew C. Pike

[57] ABSTRACT

A semi-recumbent bicycle allows the rider to sit on a high-backed seat elevated above a rear wheel in a semi-recumbent position with his legs extending forward and angling downward to a pedal crank assembly. The bicycle includes an elongated relatively large hollow main frame or frame member connecting a front steering assembly and front wheel at the front end of the bike to the rear wheel and the seat at the rearward end of the bike. The pedal crank assembly is positioned in the area of the steering assembly above the front wheel. The elongated main frame member has at least one large hollow area, and an access opening with attached door to render the hollow area a convenient integral lockable storage compartment for items such as tools, books, bicycle helmets, and groceries for example. The major portion of the storage compartment is positioned centrally between the front and rear wheels in order to assist in preventing heavy cargo from causing the bicycle to exhibit poor handling characteristics due to improper weight distribution.

7 Claims, 11 Drawing Sheets

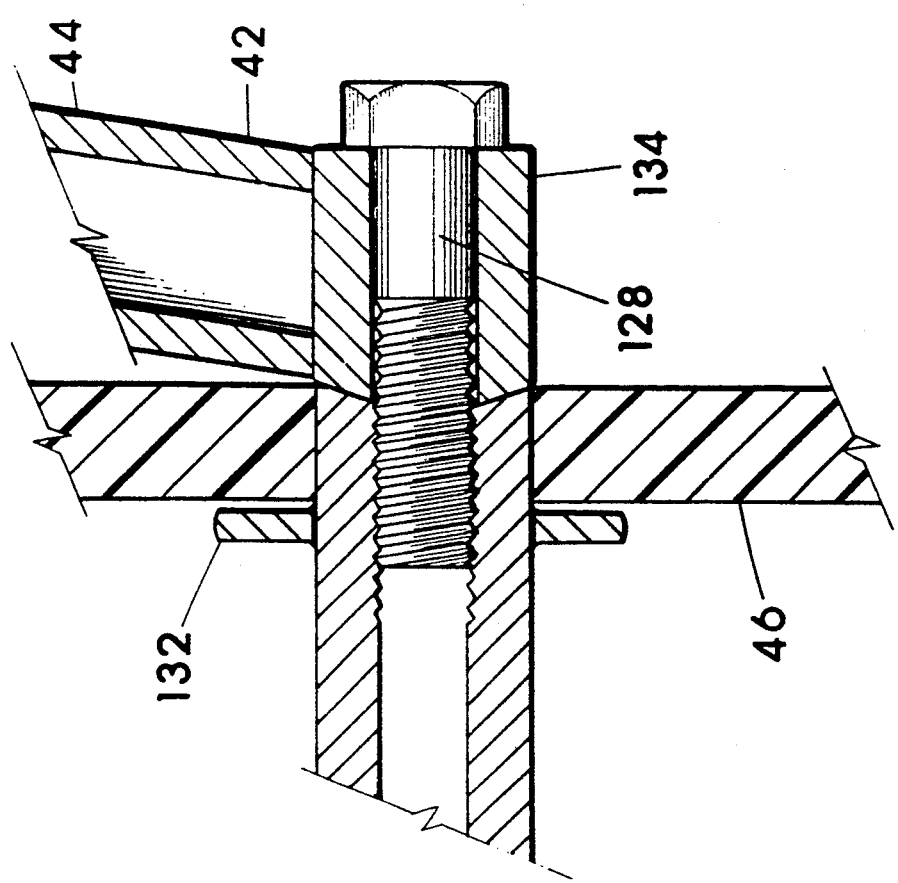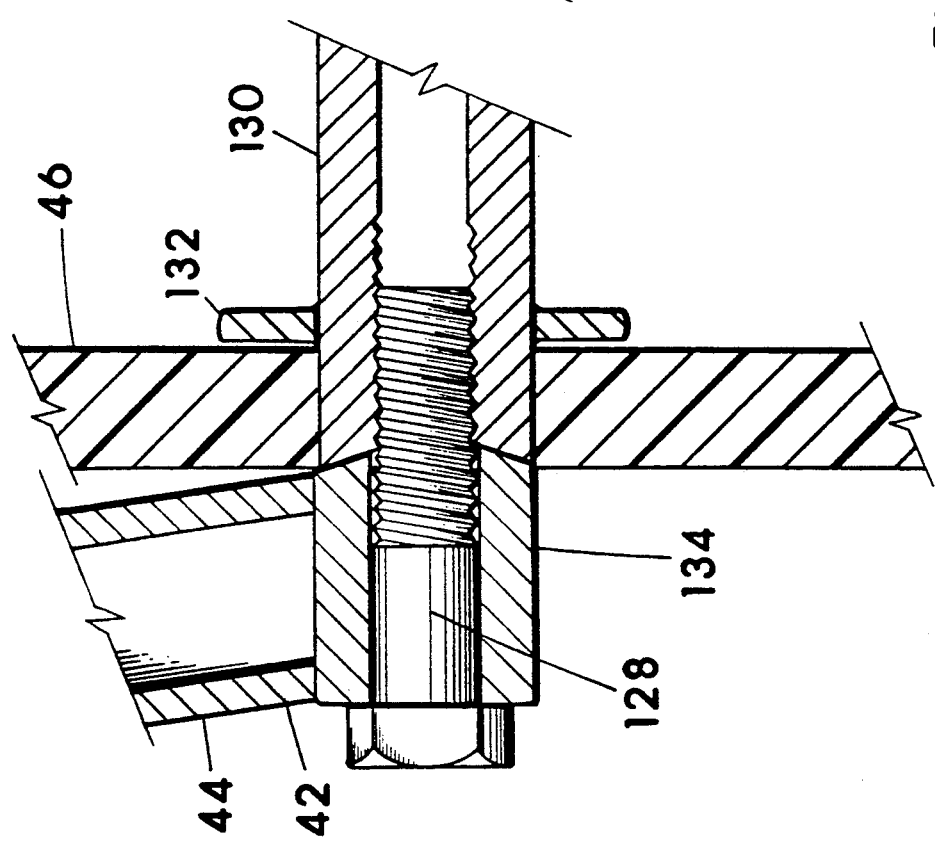
FIG. 12

SEMI-RECUMBENT BICYCLE WITH ITEM STORAGE COMPARTMENT

BACKGROUND OF THE INVENTION

1. Field of the Invention

This invention relates to two-wheel manually powered bicycles in general. More particularly the invention relates to a bicycle on which the rider sits in a semi-recumbent position while riding. One novel aspect of my bicycle is in the inclusion of at least one significantly large hollow area within a main structural frame member of the bike, and an access opening with door so as to render the hollow area a convenient storage compartment. My prior U.S. Pat. No. 4,925,203 issued May 15, 1990, for a "Semi-recumbent Bicycle with Adjustable Frame" is incorporated herein by reference for both essential and nonessential material, and will provide an improved understanding of the preferred semi-recumbent bicycle of this disclosure, and possible variations thereof.

2. Description of the Prior Art

With a semi-recumbent bicycle, the pedal crank assembly is substantially more forward and upward relative to the seat than that of the pedal crank assembly of more conventional "stand-up style" bicycles such as multi-speed racing bicycles and mountain style bicycles whereon the pedal crank assembly is essentially vertically straight downward from the seat. Relative to the seat, the pedal crank assembly of a semi-recumbent bicycle is also somewhat downward and rearward of that associated with the style of bicycles commonly referred to as fully or full recumbent bicycles. With a semi-recumbent bicycle, the rider sits in a seat, which is preferably a high-backed seat, and in a semi-recumbent position elevated upward of the top of the rear wheel, and the legs of the rider extend forward and somewhat downward from the seat to the pedals. With a fully recumbent bicycle, the normally high-backed seat is positioned forward, and substantially below the top of the rear wheel resulting in the legs and feet of the rider of a fully recumbent bicycle extending generally straight forward or in some cases even slightly upward from the seat to the pedals.

A problem associated with many prior art bicycles, but certainly not all, is the position of the pedals relative to the seat. This seat-to-pedal relationship is primarily what determines the degree of pushing power a given rider can develop. Fully recumbent bicycles normally have a good seat-to-pedal relationship as far as development of power is concerned, but the vertical height at which the rider sits on these bicycles presents significant safety problems, as sitting quite low (forward and downward of the top of the rear wheel) in a fully recumbent bicycle makes it difficult for both the rider and automobile drivers to detect the presence of each other over and around other vehicles. A significant problem with the pedal positions associated with many fully recumbent bicycles, which does not exist with semi-recumbent bicycles, is that with full recumbents, the rider's legs are normally extending straight out or even slightly upward in front of him with his feet on the pedals, and the effect of gravity is such that the feet, when not in the pushing mode, have a tendency to slip downward and off of the pedals. Although systems which clip or fasten the feet (shoes) to the pedals are known, many riders feel such shoe-to-pedal fastening systems create more problems than they solve for the average non-racing bicyclist, since if one cannot remove his feet from the pedals and place them on the ground quickly when stopping, one could easily fall. A semi-recumbent bicycle, such as that of this disclosure and the reference patent, allows for pushing against a high-backed seat, and therefore the development of high pedal pushing power is possible, without the problem of the feet tending to slide downward off of the pedals, this being due to the somewhat downward angle of approach of the rider's legs and feet to the pedals.

The high power which can be applied by pushing on the pedals with a full or semi-recumbent bicycle is in part dependant on high-backed seats which the rider can push against, in combination with the pedals being of the proper distance from the seat-back for the particular rider's leg length. If the pedals are too far from or too close to the seat-back for a particular rider's leg length, significant pushing power is lost, and therefore proper seat positioning (distance) relative to the pedals is important for the full development of power.

Proper seat positioning on semi-recumbent bicycles is somewhat more difficult than with fully recumbents, as with semi-recumbents, the seat adjustment is ideally provided with both vertical and horizontal adjustments to the seat relative to the pedals. With a semi-recumbent which in part relies on the angle of approach of the rider's legs and feet to the pedals to help maintain his feet on the pedals when not in the pushing mode, if the seat were to be re-positioned straight rearward only, or straight upward only, the angle of approach of the rider's legs and feet to the pedals could be changed, and although this angular change in some cases is insignificant and maybe even desirable, in some situations it is significant and undesirable, and therefore ideally with a semi-recumbent bike, the rider is given a choice of both vertical and horizontal seat adjustments independent of one another as is taught in the reference patent.

With such a semi-recumbent bicycle as taught in the reference patent, due to the seat position being elevated above the height of the rear wheel to elevate the rider, and the pedal crank assembly being significantly forward and slightly downward from the seat, the rider's upper legs (thighs) extend somewhat horizontally forward and then bend at the knees and angle downward to the pedals, and of course this angle is continuously changing with pedaling action. This position of the rider's legs on a semi-recumbent leaves a centrally placed significantly large open area between the front wheel and rear wheel above the path of the drive chain which the rider's legs do not have to straddle, and which the rotational path the pedal crank assembly generally does not enter.

The relatively large open area between the front and rear wheels of a semi-recumbent bicycle as previously described does not exist to the same extent with full recumbent bicycles. With fully recumbent bicycles, the rider's legs and feet are in a general straight line (horizontal) approach to the pedals from the seat, and further, the rider's legs are paralleling a structural main tube frame member of the bike, and normally, a drive chain extends through this area directly below or adjacent the main tube frame member. Additionally, the relatively large open area between the front and rear wheels of a semi-recumbent bicycle does not exist to the same extent with more conventional bicycles such as multi-speed racing bicycles and mountain style bicycles where the pedal crank assembly is essentially vertically downward from the seat, and the rider's feet on the pedals are in this area between the front and rear wheel, and the rider's upper legs in his crotch area are close together and straddling necessarily narrow frame members in their approach to the pedals.

A common problem associated with the everyday use of a bicycle is item carrying and storage capacity. Few if any prior art bicycles have adequately addressed this item carrying and storage capacity problem. Although there have been affixable "saddle-bags" for bicycles, and rigid or flexible cargo storage compartments designed and built for bicycles in the past, they have primarily been bolt-on or otherwise affixable units which attached to the structural frame members or to added cargo racks of the bike, and are normally sold as after market items. A problem with many prior art bicycle storage compartments has been in the placement on the bicycle, most commonly being over and beside the rear or front wheels. The geometries of many bicycles, and the required rider leg and feet positions thereon, do not allow for the placement of a significantly sized storage compartment in a location on the bike which maintains the designed weight distribution if heavy cargo is carried. For example, due to the position of the pedal crank assembly of more conventional stand-up style bicycles whereon the pedal crank assembly is essentially vertically downward from the seat, in providing clearance for the crank arms, pedals, and the rider's legs and feet, there is little or no room left between the front wheel and the rear wheel in which to place a significantly sized (wide) storage compartment, and this central area would be an ideal location to maintain a proper weight distribution on a bicycle. Although full recumbent bicycles in general do appear to have some existing space centrally between the front and rear wheels downward below the rider's legs and main tube of the bike, this volume is often small and occupied by drive chain and frame structure. I am not aware of any manually powered prior art bicycles, particularly high-power potential semi-recumbent bicycles, which adequately address the problem of the storage of items in a manner such as the semi-recumbent bicycles of this disclosure.

SUMMARY OF THE INVENTION

The bicycle of this disclosure addresses the problem of the lack of adequate item carrying and storage capacity on a semi-recumbent bicycle. The preferred semi-recumbent bicycle of this disclosure is of the type on which the rider sits on a high-backed adjustably positionable seat elevated upward of the rear wheel in a semi-recumbent position with his upper legs extending generally forward and angling downward to crank arms with pedals, thus allowing high power development. Good visibility and a very comfortable riding position are also provided with my bicycle. The present bicycle additionally includes a relatively large hollow structural main frame or frame member connecting a steering assembly and front wheel at the front or forward end of the bike to the rear wheel with seat and chain stays, and the adjustably positionable seat at the rearward end of the bike. The pedal crank assembly is positioned above the front wheel, and thus a significantly large and normally open space is left between the front wheel and the rear wheel, which is generally centrally positioned. The relatively large structural main frame member has at least one storage compartment, and an access opening with a movable door over the opening are provided so as to render the compartment in the main frame member a convenient and preferably lockable storage compartment for items such as tools, bag lunches, camping gear, clothing, books, and bicycle helmets for example. The major portion of the storage compartment is positioned centrally between the front and rear wheels in order to assist in preventing heavy cargo from causing the bicycle to exhibit poor handling characteristics due to improper weight distribution. The storage compartment and access opening with door are preferably structured "drip tight" to prevent rain from entering the compartment and wetting stored items. The storage compartment may include internal shelves, structural braces and gussets, and sub-compartments, depending on design choices and materials used. Additional doors may be used to provide added convenience to accessing certain areas of a single storage compartment, or to access separate storage compartments within the main frame member or elsewhere on the bike as will be explained.

Structures and principles of my invention will be better understood with a reading of the reference patent and of the below remaining specification along with examination of my drawings of structural embodiments of the present invention. The drawing figures and the Description Of The Preferred Embodiments are illustrative and descriptive of some of the structures and principles which may be incorporated in a number of slightly different semi-recumbent bicycles, all of which are in accordance with the present invention. The drawings and written description are given only for example in order to allow those skilled in the art to be easily able to build and use at least one semi-recumbent bicycle in accordance with the present invention, and are not meant to limit the scope of the invention only to the specific structural embodiments detailed.

BRIEF DESCRIPTION OF THE DRAWINGS

FIG. 12 is a partial cross-sectional view intended to illustrate one of several feasible attachment arrangements which could be used to attach individual seat and chain stay members of the types shown in the first and second embodiments to the main frame member.

DESCRIPTION OF THE PREFERRED EMBODIMENTS

Figure 1:
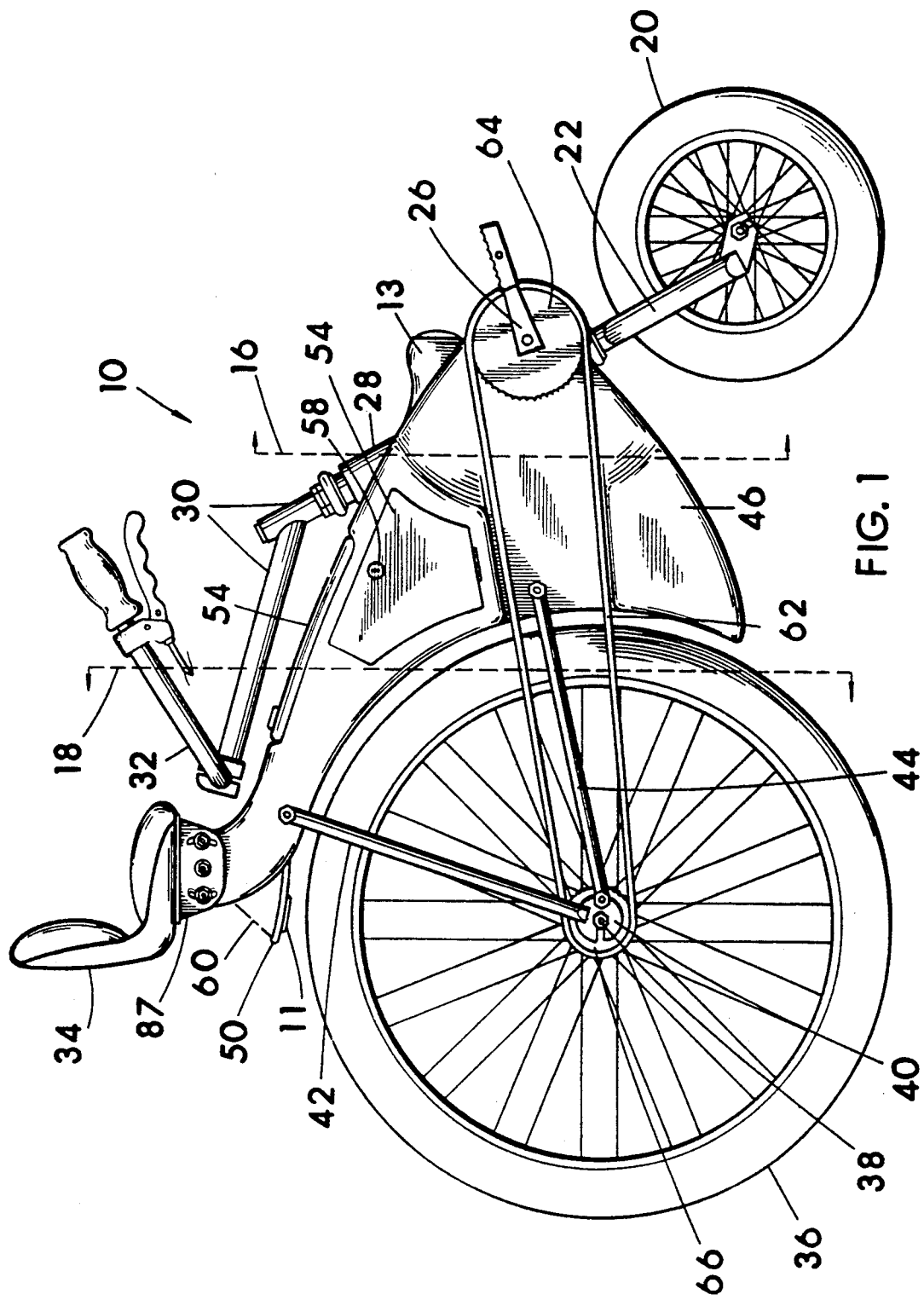
FIG. 1 is a right side view of a first embodiment of semi-recumbent bicycle in accordance with the present invention.

The present invention in one form may be considered to be my prior art bike of the reference patent with as few modifications made thereto as the telescopic angled top tube 86 of the reference bike being enlarged somewhat; the inner member of the angled top tube 86 being shortened to ensure free interior open space centrally and toward the head tube 54 within the outer member of tube 86; an access opening being provided through a wall of the outer member of angled top tube 86 into the open space, and a movable door being affixed over the access opening. With the inner member shortened, and of course enlarged commensurately with outer member of angled top tube 86, there still remains a substantial degree of adjustability in the length of the angled top tube 86 for seat position adjustments. The enlarging of the angled top tube 86 is to allow the storage of a item such as a water bottle, tools, or a bag lunch for example.

In view of the previous paragraph, it should be noted that I feel the present invention may be structured in numerous ways and with various materials depending on preference and cost considerations. For example, in drawing FIGS. 1 through 12, various closely related embodiments 10, 12, and 14 of my semi-recumbent bicycle in accordance with the present invention, and some individual components thereof, are shown for example. Multiple slightly varied embodiments of bikes are shown in full or in part simply to illustrate some, but not all of the possibilities within the scope of the present invention. Like parts of these various embodiments are given like reference numerals. In all embodiments of my bicycle, multiple gearing may or may not be used. All versions of my bicycle may be equipped with known braking systems using caliper or drum brakes operational by brake cables and brake levers or other suitable braking systems such as hydraulic brakes. Reflectors 11 and lights 13 may of course also be used as desired with the present invention, and in FIGS. 1 and 2, a front headlight 13 is shown, while rear reflectors 11 are also shown in various drawing figures.

In any of my bikes in accordance with the present invention, main frame member 46 may be made of any suitable materials and methods of construction. Some materials and methods of construction for main frame member 46 which I have considered as being suitable are the casting and machining of metals; the bending and fabricating with sheet metals; plastic injection molding; plastic injection blow molding; fiber glassing or using carbon fibers and or composites with resins over rigid or deflatable molds; and thermal or vacuum thermal forming of plastics or combinations thereof to name just a few materials and methods of construction. The particular construction of course will be determined by a large number of factors including cost, desired strengths for particular applications, weight, weight-to-strength ratios, rigidity, and shock absorbtion to name just a few.

Figure 2:
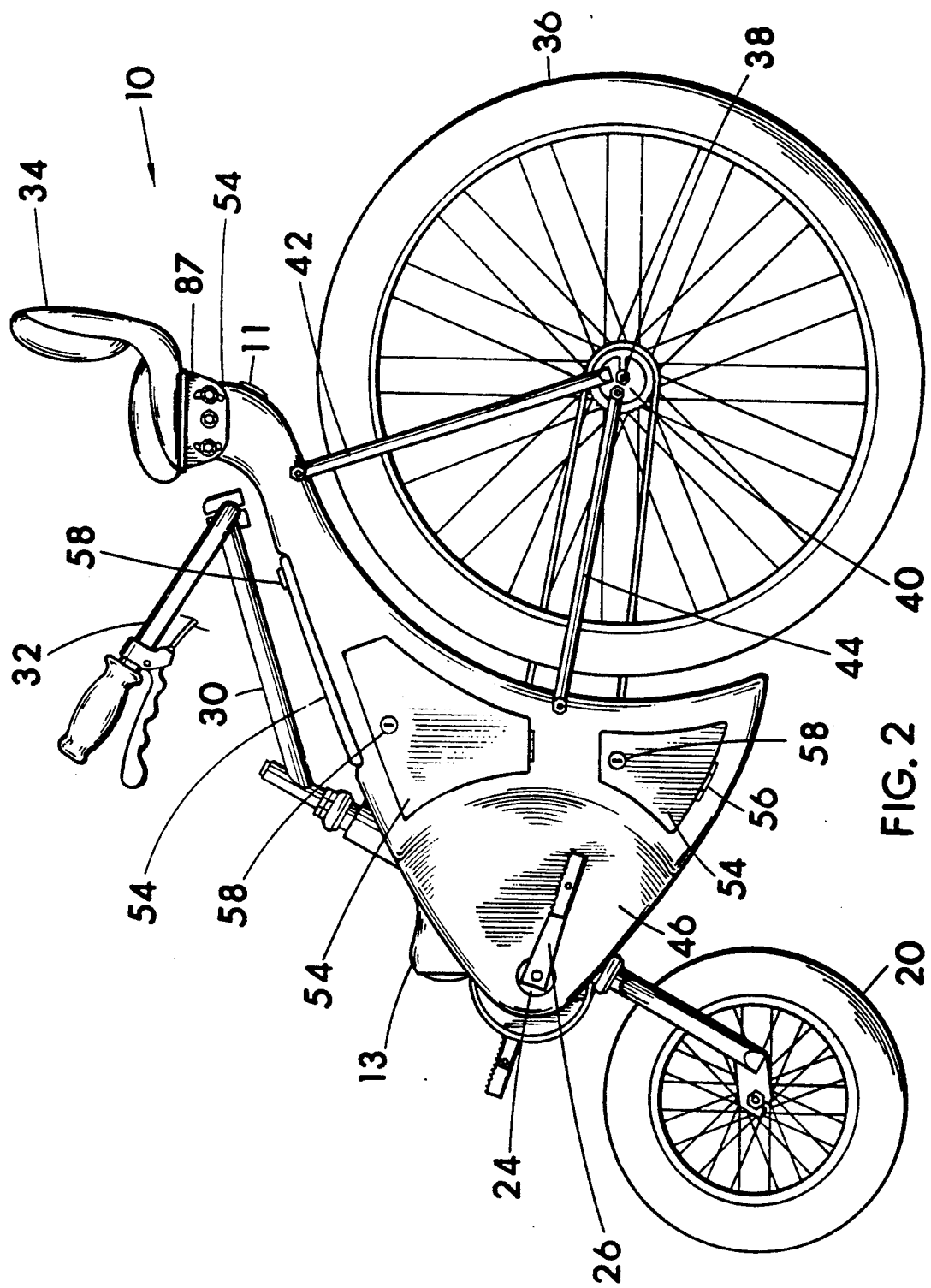
FIG. 2 is a left side view of the first embodiment of a semi-recumbent bicycle.

FIGS. 1 through 4 are of first embodiment 10. FIG. 1 is a right side view of embodiment 10 of my semi-recumbent bicycle in accordance with the present invention and being quite similar to my semi-recumbent taught in the reference patent. FIG. 2 is a left side view of embodiment 10. Embodiment 10 is also similar to the other embodiments 12 and 14 which will be described later. Bikes in accordance with the present invention may be considered to be comprised of three primary sections or portions, which are: a forward or front portion; an intermediate portion (central); and a rearward portion oppositely disposed from the forward portion. The sections or portions are indicated in FIG. 1 wherein line 16 having arrows roughly indicates the forward portion, line 18 roughly indicates the rearward portion, and that existing between lines 16 and 18 roughly indicates the intermediate portion of the bike. The term "roughly indicates" is used since these sections or portions are not definable in absolute terms or areas, and the lines 16 and 18 could be moved in FIG. 1 a little one way or the other.

Generally existing within the forward portion of the bike is the front wheel 20 rotatably connected to and supported by front forks 22; the bottom bracket assembly 24 and crank arms 26, and the majority if not all of the steering assembly 28 linking the forks 22 to the handlebar 32 with the steering stem 30. The bottom bracket assembly 24 may or may not be connected directly to the steering assembly 28, but will be in the general vicinity thereof as will be appreciated with continued reading and by reviewing the reference patent. Existing within the rearward portion of the bike is the high-backed seat 34, and most of the rear wheel 36 with the axle 38 thereof supported by axle drop-out plates 40 which in turn are supported by a pair of seat stays 42 and a pair of chain stays 44 in embodiment 10.

The forward portion of the bike is structurally connected to the rearward portion with the elongated main frame member 46. Main frame member 46 is a hollow substantially rigid structural member tying the forward and rearward portions of the bike together. A slightly modified or variant of main frame member 46 of embodiment 10 may be seen in FIG. 6 wherein the main frame member 46 is shown split into two sections in order to show the hollow storage area or compartment 50 which is common to bikes in accordance with the present invention.

Main frame member 46 is connected to the steering assembly 28 and extends rearward and upward at an angle therefrom into the rearward portion of the bike to support seat 34. Main frame member 46 has a forward portion, an intermediate portion, and a rearward portion all of which generally correlate in position with the forward, intermediate, and rearward portions of the bike as shown by lines 16 and 18 in FIG. 1.

Figure 5:
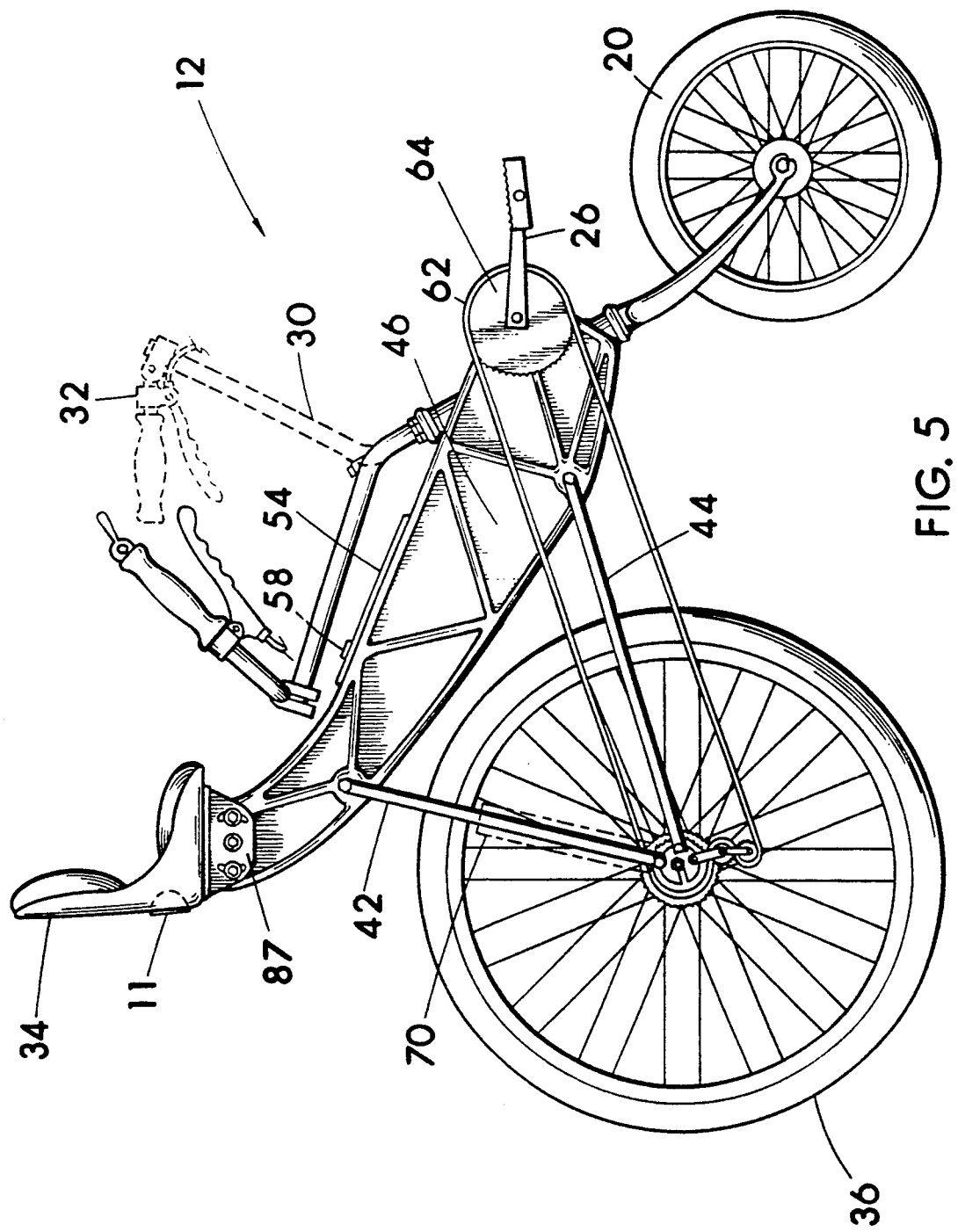
FIG. 5 is a right side view of a second embodiment of semi-recumbent bicycle in accordance with the present invention.

Some features which are taught in the reference patent which may be applied to the present invention include the use of rigid seat stays and non-pivotal chain stays, or shock-absorbing seat stays may be used with pivotally attached chain stays to suspend the rear wheel as shown in FIG. 5 of the present disclosure. The chain stays may be attached at the forward ends thereof in the forward portion, the intermediate portion, or possibly even the rearward portion of main frame member 46, although spreading of the connections of the chain stays and seat stays from one another in connection to main frame member 46 renders a strong triangulated structure, and therefore the chain stays are preferably attached at the forward ends thereof in the forward or intermediate portion when the upper ends of the seat stays 42 are attached near seat 34 of main frame member 46.

The present invention may use a handlebar and steering stem arrangement like that taught in the reference patent, or as an alternative may use a more conventional handlebar placement wherein the steering stem 30 does not support the handlebars 32 in a manner wherein they originate underneath the rider's upper legs, but rather as indicated in dotted lines in FIG. 5, the upper portion of the steering stem 30 is more vertically inclined and the handlebars 32 are positioned upward and forward more like conventional bikes. Either handlebar position functions well with such a bike; however, the lower steering stem is somewhat safer in that when a rider quickly dismounts over the front of the bike for any reason, such as if he hits a chuck hole or a curb with the front wheel bringing the bike to a sudden stop, during such a dismount, the rider can strike the more vertical style steering stem with handlebar in the crotch area and possibly become injured.

As previously indicated, the main difference between the prior reference bike and the bike in accordance with the present invention, as illustrated in FIGS. 1 and 2, is in the structure of the main frame member 46 of the present invention and the angled top tube 86 of the bike of the reference patent. Main frame member 46 of the present invention is different mainly because it is larger and structured with at least the one chamber or open storage area 50 sized sufficiently large to be of use as an item storage compartment. This storage compartment 50 is defined by the material which defines main frame member 46, and an access opening 52 through main frame member 46 is provided to allow the placement of items in the compartment 50. A door 54 is attached over the access opening 52. The door 54 may be economically attached by a hinge 56 attached to the door and to main frame member 46. Door 54 preferably further possesses a latch 58 which functions cooperatively with the surrounding edge of main frame member 46 which defines access opening 52 so the door 54 may be releasibly maintained in the closed position. The latch 58 preferably incorporates a key or combination lock to prevent unauthorized entrance into the storage compartment. Door 54 with a lockable latch 58 render item storage compartment 50 a lockable storage compartment in which items may be left stored and relatively secure from theft. FIG. 1 shows a top door 54 beneath steering stem 30, and side door 54 in main frame member 46.

Figure 3:
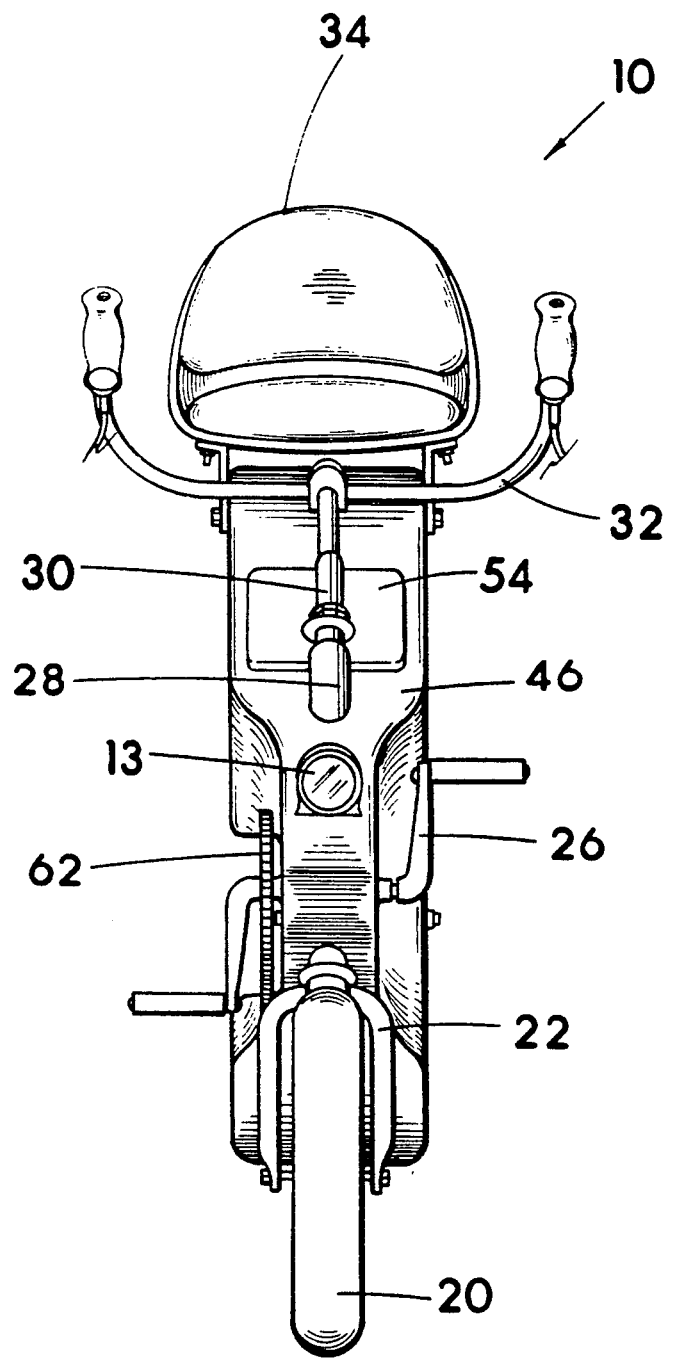
FIG. 3 is a front view of the first embodiment.
Figure 4:
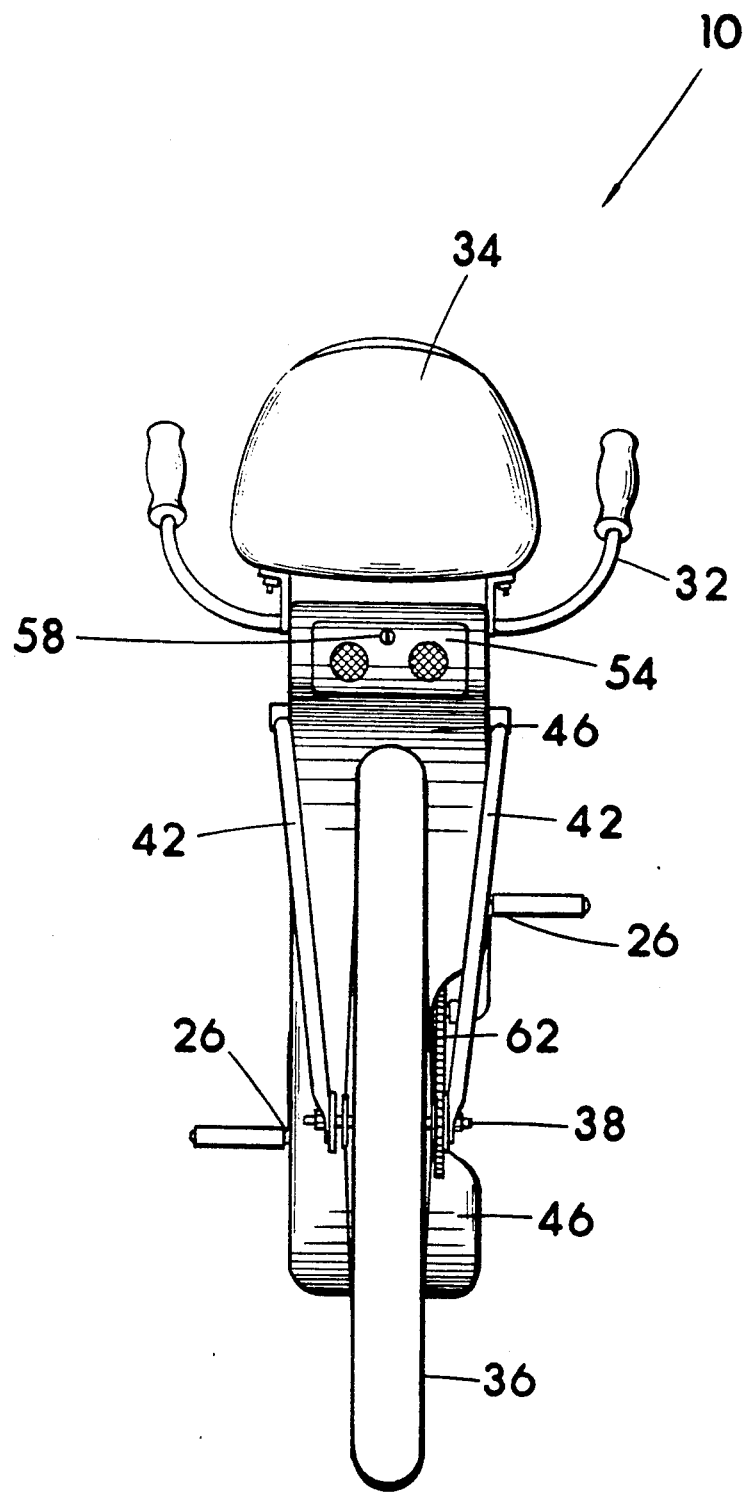
FIG. 4 is a rear view of the first embodiment.

Storage compartment 50, or at least the main storage compartment or the largest part thereof, is preferably positioned in the intermediate portion of the bike in order to help maintain proper weight distribution should heavy cargo be stored in the compartment 50. Other separate or connected storage compartments may be defined in main frame member 46, and each may also have a lockable door as shown in FIG. 1 where a door 54 into a storage compartment 50 directly under seat 34 is shown in the open position, and tethered by a flexible cord 60 to show an example of how the door 54 may be set so not to open beyond a given point. It should be noted a sliding "pocket" style door or fully removable door might also work well instead of the hingidly attached doors over the storage compartments. As may be seen in FIG. 2, several doors 54 over access openings may be applied to access a single storage compartment for convenience. In FIGS. 1 and 2 it may be seen that a large volume of space within main frame member 46 is positioned above the path of the drive chain 62 as it extends from the front sprocket 64 to the rear sprocket 66. The particular main frame member 46 of embodiment 10 is shaped to also provide additional storage space downward below chain 62, and in FIG. 2, a lower access opening and door 54 are shown for accessing the lower portion of the storage compartment which may or may not be otherwise easily accessed through the upper door 54 since the upper and lower storage areas may be completely separated from one another by a partition or partially separated by internal shelves 68 similar to those shown in FIG. 8. The shelves 68 could be permanently or removably or adjustably attached. FIG. 3 is a front view, and FIG. 4 is a rear view of embodiment 10, and from these two views it can be seen that the width of main frame member 46 can be substantial, at least in certain areas if one wishes. In FIG. 3, it can be seen that the width of main frame member 46 has been reduced to provide clearance for the drive chain 62 and pedal crank arms 26 which also provides clearance for the rider's feet (heels) on the pedals; and in order to provide a larger amount of storage space, main frame member 46 widens out beyond the reduced width areas.

Figure 6:
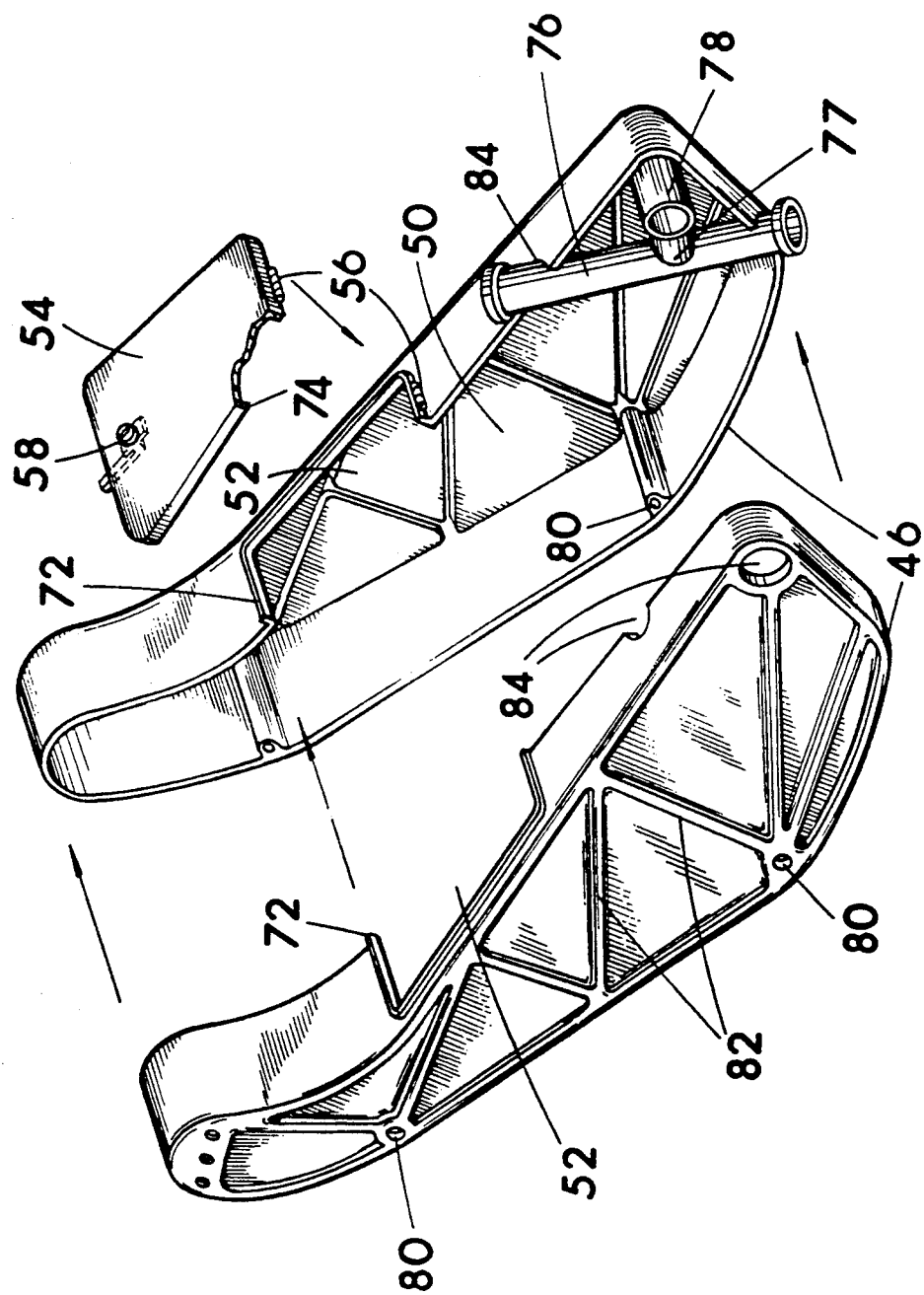
FIG. 6 is a partial exploded view of the main frame member of the second embodiment bicycle of FIG. 5.

The main frame member 46 of embodiment 10 is shaped and sized to provide a large amount of internal storage space, whereas main frame member 46 of embodiment 12 shown in FIGS. 5 and 6 is smaller, but still renders a significantly large storage area 50. The example of the invention shown in FIG. 5 shows with dotted lines at 70 the use of a shock absorber. The shock absorbers 70 to suspend the rear wheel 36 would be used in conjunction with the forward portion of the chain stays 44 being pivotally attached as explained in the reference patent. Alternately a single shock absorber may be mounted between joined upper struts and the main frame centered over the rear wheel similar to that in FIG. 15 of the reference patent.

The main frame member 46 in FIG. 6 is a two-piece member split with a central lengthwise seam which could be secured together using any suitable manner such as welding, gluing, nuts and bolts, or riveting for example, depending on the material from which the frame member 46 is fashioned. Of course the main frame member 46 could be made as a single piece using plastic injection blow molding or any other suitable process. Main frame member 46 in FIG. 6 is shown with a plurality of stiffening ribs 82. The main frame member 46 in FIG. 6 is structured to allow for the attachment of the seat stays and chain stays with long bolts passing through apertures 80 and compression resistant tube members to the other side of the member 46 whereat nuts and washer would be applied.

Also shown in FIG. 6 is a raised flange or lip 72 around the access opening 52, and from the cut-away of the door 54 in FIG. 6, it can be seen that a flange or lip 74 is provided as part of the door 54 and sized to overhang the lip 72 to render the arrangement drip tight against water entrance when the door 54 is in the closed position. Rubbery gaskets could be used as an alternative to the flanges or lips 72, 74, or in combination therewith to prevent water from entering the storage compartment 50. Measures should be taken at any other area where water might enter storage compartment 50 if stored items are to be kept dry. A small weep hole in the lowest point of main frame member 46 might be a good idea in order to drain off any small amounts of water which might get into storage compartment 50. Such water entrance prevention measure would be a good idea on any embodiments of the invention.

Also shown in FIG. 6 are tubes at 76 and 78 which on conventional bikes and this particular bike are the head tube (part of the steering assembly 28) and the bottom bracket assembly. A short extension tube 77 is shown welded between the two tubes 76, 78, and the short extension tube 77 simply makes for a stronger and more rigidly and properly aligned connection. Tube 76 will receive the bearings, the upper portion of the front forks, and the lower portion of the steering stem along with the other conventional parts which make-up a front wheel support and steering assembly. Tube 78 will receive the bearings, bearing cups, and crank spindle as is conventional with bottom bracket assemblies on bicycles. Tube 78 could be welded directly to either the front or rear side of tube 76 if desired. Depending on the material used for the tubes 76 and 78, whether plastics or metals, and depending on the materials used to make main frame member 46, tubes 76 and 78 may be affixed stationary in the member 46 using mechanical restraints such as notches and holes 84 as shown in FIG. 6, and adhesives and heat welding might also be used.

Figure 7:
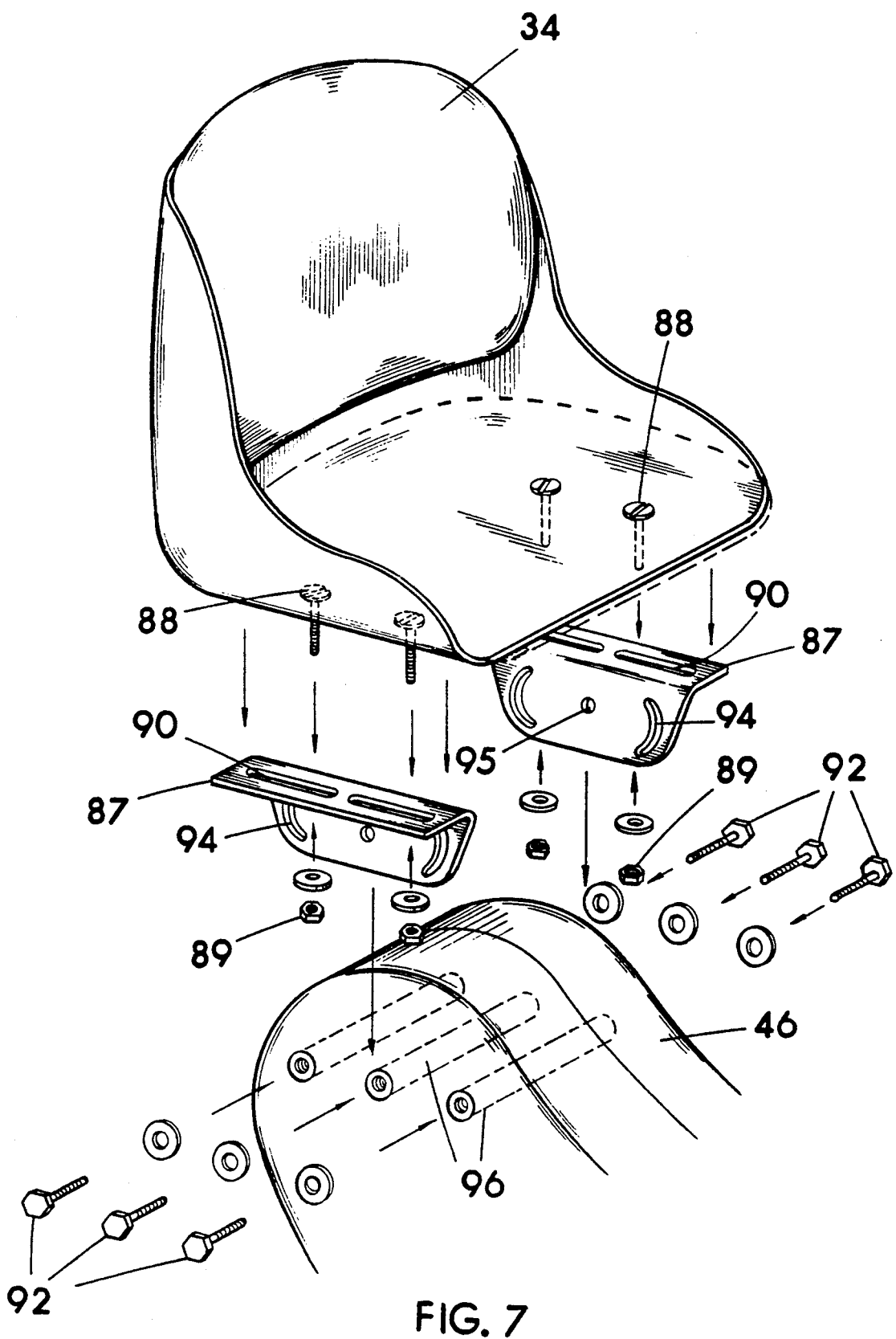
FIG. 7 is a partial exploded view of an adjustably positionable high-backed seat which may be utilized with the present invention.

FIG. 7 is a partial exploded view of an adjustably positionable high-backed seat 34 which may be utilized on the present invention such as is shown on the first 10 or second 12 embodiment bicycles. In the FIG. 7 example, the high-backed seat 34 mounts with two brackets 87 with bolts 88 through the seat 34 bottom and through elongated slots 90 in the brackets 87 and followed by the application of washers and nuts 89. By loosening the nuts 89, the seat 34 may be positioned by sliding rearward or forward relative to the brackets 87 due to slots 90, which is also rearward or forward relative to the pedals. Brackets 87 are attached to each side at the rearward end of main frame member 46, and in this example, three bolts 92 and washers are used to attach each bracket 87. On each bracket 87, one bolt 92 is inserted through a center aperture 95 to render a pivot point which allows tilting of the seat 34 rearward or forward, and two of the bolts 92 are inserted through curved slots 94 in brackets 87. The curved slots 94 provide for tilting of the seat 34 when desired, and when all bolts 92 are tight, tilting is prevented due to the number, surface area, and the pressure provided by three bolts 92 per bracket 87. Bolts 92 may be threaded into tapped holes in main frame member 46 under certain circumstances, or as is shown in FIG. 7, may be threaded into the threaded ends of tubes 96 spanning across the interior of the main frame 46. In this particular example, in order to change the vertical height of seat 34, brackets 87 of a different length extending from the bottom of the seat 34 to the center aperture 95 and slots 94 are utilized, whereby a longer set of brackets 87 raise the seat, and a shorter set of brackets 87 lower the seat 34 vertically relative to the pedals and main frame member 46.

Figure 8:
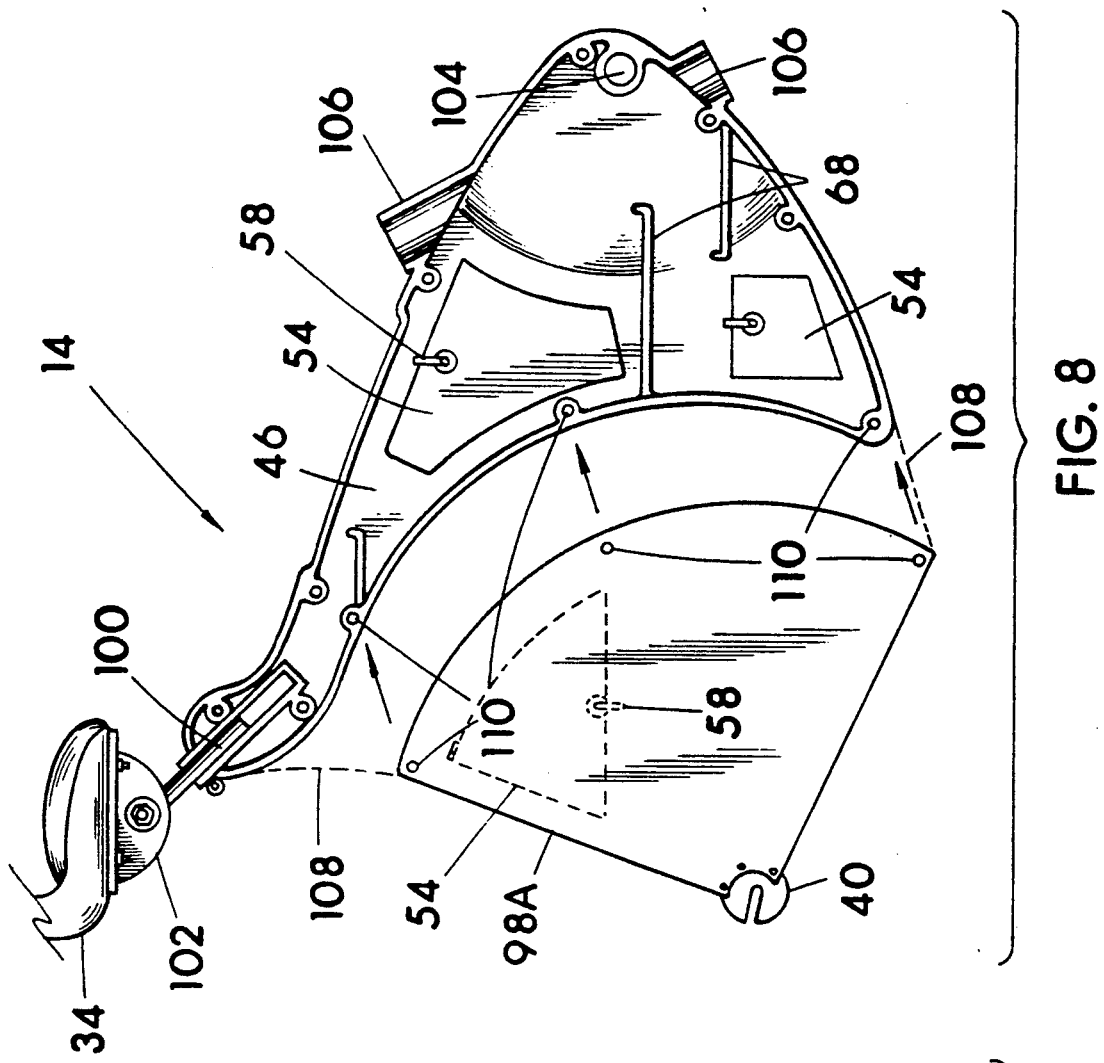
FIG. 8 shows the interior of a left half of a two-piece main frame member split with a central lengthwise seam, and showing an alternative adjustable seat attachment from that shown in FIG. 7, and further showing a left side rear wheel support member. The rear wheel support member includes an axle drop-out plate for supporting one end of the rear wheel axle, and additionally includes storage space. A similar right side rear wheel support member would be used with the left side rear wheel support member.
Figure 9:
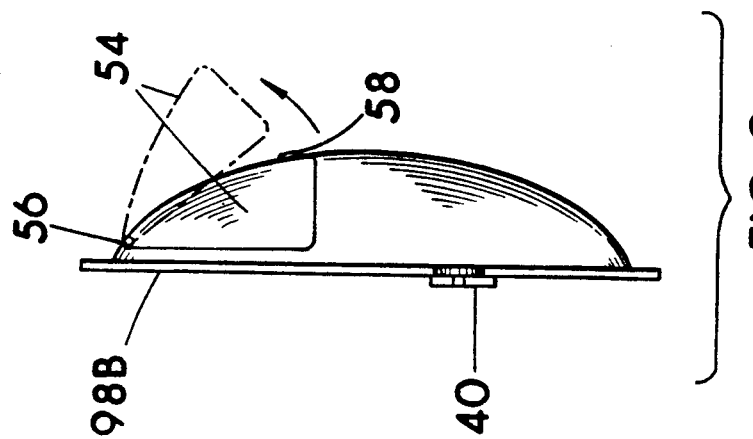
FIG. 9 is an end view of one rear wheel support member like that of FIG. 8 showing the member having sufficient depth to provide a storage compartment, and an access door.

FIG. 8 being designated embodiment 14 shows the interior of a left half of a two-piece main frame member 46 including a more conventional seat tube and seat post 100 affixed within the rearward portion of the main frame member 46. This frame 46 could be made as one piece, as doors 54 and access openings under the doors 54 allow for reaching within the frame to affix parts when needed, and this is generally true of any of the bikes in accordance with the present invention. The angled affixment of the seat tube and seat post 100 as shown provides for both horizontal and vertical height adjustments of seat 34. Seat 34 is attached to the seat post with two brackets 102 which are similar to brackets 87 having the equivalent to elongated slots 90 of brackets 87 to allow the sliding positioning of the seat 34 rearward or forward as desired. Brackets 102 in this example attach to the seat post using a center bolt with nut which may be arranged to allow pivotal adjustments to the tilt angle of the seat 34 if desired.

Shown at the front end of the main frame member 46 of embodiment 14 in FIG. 8 is aperture 104 in which to install the crank spindle of the bottom bracket, and tubular members 106 which are shown as one-half of a tube, and are for installing the front fork and support bearings therefore below aperture 104, and for installing the steering stem and the support bearing therefore above aperture 104.

Shown at the rear end of the main frame member 46 of embodiment 14 in FIG. 8 is a triangulated rear wheel support 98A which is for supporting the left end of the rear wheel axle. The right end of the rear wheel axle would be support by a mirror structure shown in FIG. 9 from an end view and designated 98B. Both the left and right rear wheel support members 98A and 98B include an affixed axle drop-out plate 40, and also are hollow structures with at least one access door 54 and latch 58 (preferably lockable and watertight) so as to serve as both rear wheel supports and cargo or storage compartments and thereby add to the overall carrying capacity of the bike. In FIG. 8, the rear wheel support member 98A is indicated with dotted lines at 108 to show the possible location of material should the members 98A and 98B be molded or otherwise fabricated as an integral part of main frame member 46. I believe main frame member 46 and the left and right side rear wheel supports 98A and 98B could be made as a single integral unit using fiber glass or carbon fibers and resins or the like, or using plastic injection blow molding for example, and this might be quite economical. The axle drop-out plates 40 could be made as part of the integral frame and rear wheel support, or attached in any suitable manner such as with bolts or rivets or adhesives for example. In solid lines in FIG. 8 is the left rear wheel support member 98A having bolt apertures 110 which allow for the bolt-on attachment of these cargo carrying rear wheel support members 98A and 98B to main frame member 46 via bolt apertures 110 in frame member 46. In either case, the cargo carrying rear wheel support members 98A and 98B are optional, and which if applied would greatly increase the cargo carrying capacity of the bike as a whole. Heavier stored items would be best kept in the storage compartment 50 in main frame member 46 while the lighter items such as clothing could be stored in the rear wheel supports 98A and 98B in order to optimize the handling characteristics of the bike.

Figure 10:
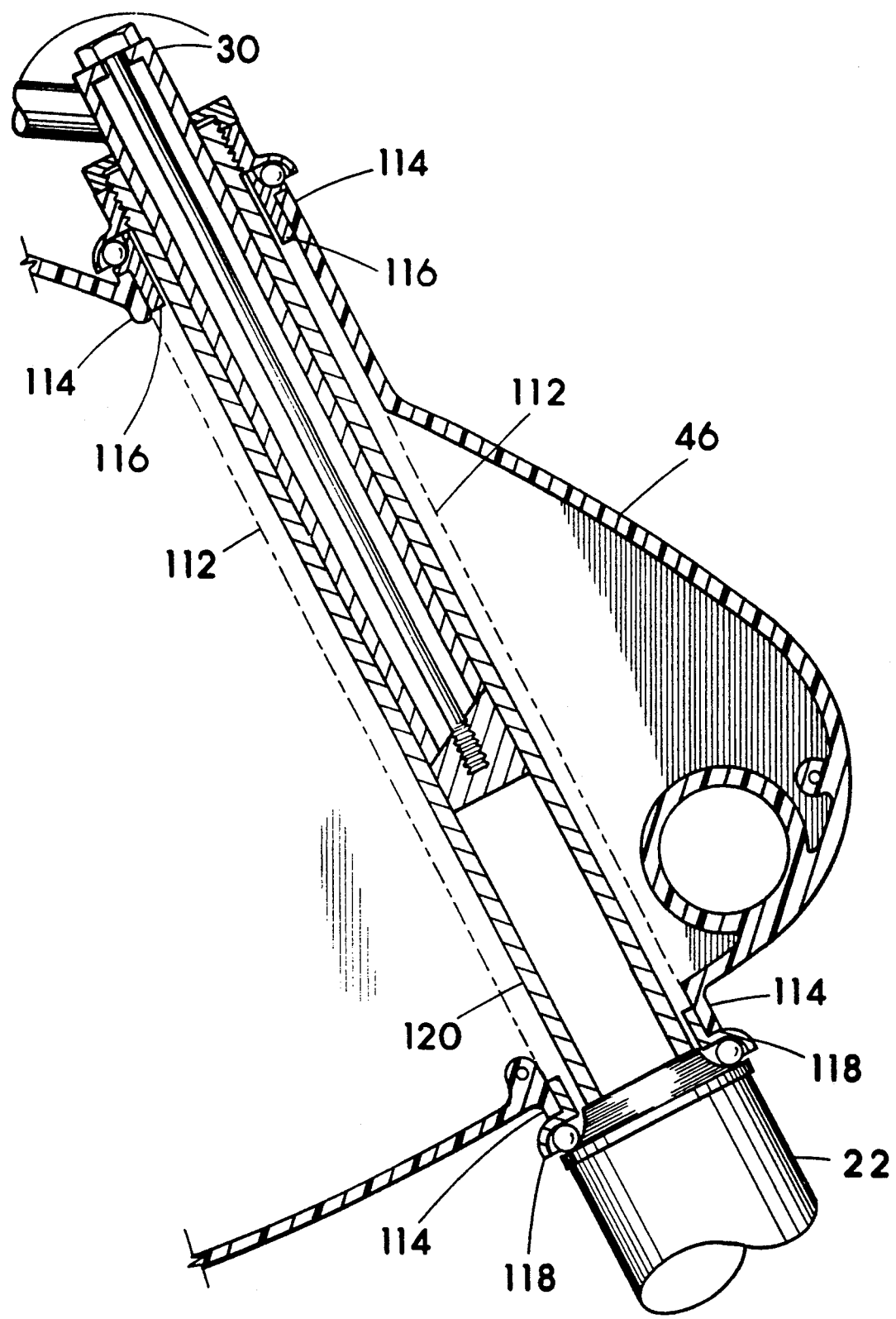
FIG. 10 is a partial cross-sectional view intended to illustrate components of a steering assembly which may be used with the present invention. The handlebar is not shown in this view.

FIG. 10 is a partial cross-sectional view of the front end of a plastic main frame member 46 (could be any other suitable material) intended to illustrate components of a conventional steering assembly which may be used with the present invention. The handlebar 32 is not shown in this view. In this example, the typical head tube indicated by dotted lines 112 has been eliminated, and the molded plastic at 114 receives the upper bearing cup 116 for the steering stem, and the lower bearing cup 118 for the front forks 22, and this might be quite economical. Adhesives, mechanical fasteners, or frictional adhesion might be used to retain the bearing cups 116 and 118. The connection of the fork steerer tube 120 which is rigidly attached to and considered a component of the front forks 22 to the steering stem 30 may be made in any suitable manner, and in the drawings (FIG. 10 and others) those skilled in the art will recognize the conventionality of the connections to cause turning in forks 22 for steering the bike with the movement of handlebars 32 which in turn rotates or spins steering stem 30 and forks 22.

Figure 11:
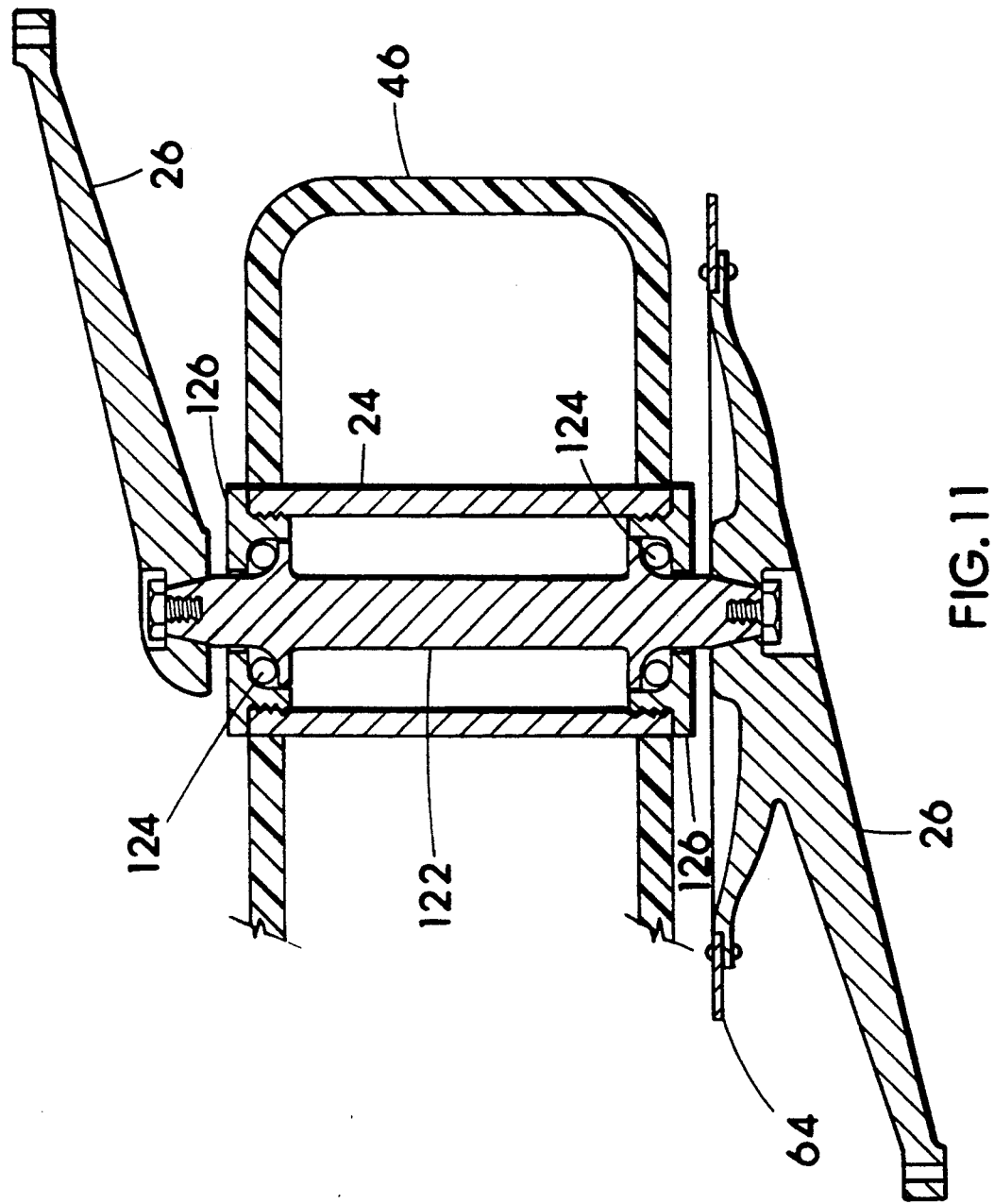
FIG. 11 is a partial cross-sectional view intended to illustrate components of a standard bottom bracket and crank arm assembly which may be used with the present invention.

FIG. 11 is a partial cross-sectional view intended to illustrate conventional components of a bottom bracket assembly 24 with attached crank arms 26. The outer metal tube of the bottom bracket assembly is affixed stationary with the forward portion of the main frame member 46 which in the example is plastic. The stationary affixment of the tube of the bottom bracket assembly may be made by the insertion of the tube into the molding tool before the shooting of the molten plastic, which is a relatively common procedure in the plastic molding industry. The bottom bracket assembly is shown having a crank spindle 122 supported by bearing 124 and bearing cups 126. That which is shown is conventional and will work with the present invention; however any suitable pedal crank assembly and support therefore could be used, for example the outer tube of the bottom bracket assembly might be eliminated and the bearing cups 126 might be affixed directly into threaded or unthreaded apertures in main frame member 46.

FIG. 12 is a partial cross-sectional view intended to illustrate one of several feasible attachment arrangements which could be used to attach individual seat stays 42 and chain stays 44 like those shown in embodiment 10 and 12 to the two oppositely disposed sides of main frame member 46. Shown are the ends of either the seat or chain stays 42, 44 since they could appear the same, with the stay ends attached with bolts 128 to a threaded sleeve or tube 130 passed transversely through main frame member 46. The tube 130 is stabilized with backing washers 132 welded or otherwise affixed to the exterior of tube 130 and positioned within main frame member 46 against the interior surface thereof. Tube 130 is positioned with the open internally-threaded ends exposed through apertures in frame member 46. The exposed ends of tube 130 around or defining the opening are fashioned concavely, and the attachment bosses 134 on the ends of the stays 42, 44 are fashioned convexly so that an indexing arrangement is provided at the stay attachments which renders greater strength and stability. Of course other attachment arrangements could be used within the scope of the invention, but that which is shown in FIG. 12 for example is one which has been found to function well.

Although I have described some preferred structures of the invention, it should be understood that the specific details are given only for example to those skilled in the art. Many changes in the specific structures described may be made without departing from the true scope of the invention as depicted by the appended claims.

What I claim as my invention is:

1. A bicycle on which a rider sits in a semi-recumbent position while riding said bicycle, and which includes an elongated substantially hollow main frame member having at least one substantially large accessible item storage compartment therein, said bicycle comprising:

a front wheel support and steering assemblage retaining a rotatably connected front wheel and a rotatably connected steering stem, a handlebar connected to an upper portion of said steering stem, said front wheel support and steering assemblage including means whereby movement in said handlebar by the rider equates to sideways movement in said front wheel for steering of said bicycle;

said main frame member having a relatively narrow forward portion and an oppositely disposed rearward portion, and further having a wide intermediate portion positioned between said narrow forward portion and said rearward portion;

at least said wide intermediate portion of said main frame member being substantially wider than said narrow forward portion of said main frame;

said front wheel support and steering assemblage connected to said narrow forward portion of said main frame member;

said main frame member having at least one large hollow area positioned in said wide intermediate portion to serve as said item storage compartment;

an access opening through an exterior wall of said main frame member into said item storage compartment;

a movable door placed over said access opening;

a latching means connected cooperatively between said door and said main frame member so as to render said door releasibly closed over said access opening;

a seat with back rest connected to said rearward portion of said main frame member;

a rotatable rear wheel having an axle supported in axle drop-out plates, said axle drop-out plates connected to and supported by axle drop-out plate support means, said axle drop-out plate support means connected to said main frame member;

said rear wheel positioned in elevation below said seat and generally rearward of said wide intermediate portion of said main frame member;

said rear wheel including at least one rear sprocket connected to rotate with said rear wheel;

said item storage compartment within said wide intermediate portion positioned generally between said front and rear wheels so as to position any cargo and the weight thereof within said item storage compartment generally centrally between said front and rear wheels to maintain a generally centrallized weight distribution;

a manual powering assembly providing means to allow powering of said bicycle by the rider's legs with the rider sitting on said seat in the semi-recumbent position, said powering assembly comprising a bottom bracket assembly connected to said narrow forward portion adjacent the connection of said front wheel support and steering assemblage to said narrow forward portion of said main frame member, said bottom bracket assembly supporting two oppositely disposed rotatable crank arms each having a foot pedal attached thereto, said rotatable crank arms and said foot pedals positioned in the area of said narrow forward portion of said main frame member, said narrow forward portion of said main frame member being sufficient in area relative to a rotational path of said rotatable crank arms and said foot pedals so as to provide clearance for the rider's feet whiling pedaling;

at least one front sprocket connected to rotate with rotation of said crank arms, said front sprocket connected by a drive chain to said rear sprocket to provide means for rotating said rear wheel with rotation of said crank arms;

said bottom bracket assembly with said crank arms and said pedals positioned in elevation generally above said front wheel and below said seat, and substantially forward of said seat so that the rider's upper legs extend forward above said wide intermediate portion of said main frame member and then the rider's lower legs angle somewhat down to said pedals whereat the rider's lower legs straddle said narrow forward portion of said main frame member in approaching said pedals.

2. A bicycle according to claim 1 wherein said door is connected to said main frame member by hinge means; and said latching means includes a security locking means so as to assist in preventing un-authorized entrance into said item storage compartment.

3. A bicycle according to claim 2 wherein said seat is connected to said main frame member by adjustable means providing adjustment capabilities to the position of said seat on said main frame member relative to said pedals.

4. A bicycle according to claim 3 wherein said door and said access opening include cooperative water entrance prevention means to assist in maintaining said item storage compartment dry.

5. A bicycle according to claim 4 wherein said handlebar is supported by an elongated rearward extending portion of said steering stem above said main frame member and in a position relative to said seat so that with the rider sitting on said seat, the handlebar originates underneath the rider's upper legs and said handlebar extends outward and upward to provide a portion of said handlebar disposed adjacent the exterior of each of the rider's legs.

6. A bicycle according to claim 5 wherein said axle drop-out plate support means includes seat stay member connected to said axle drop-out plates and angling upward therefrom to support said rearward portion of said main frame member; said axle drop-out plate support means further including chain stay members connected to said axle drop-out plates and extending forward toward said bottom bracket assembly and connecting to said main frame member.

7. A bicycle according to claim 6 wherein said seat stay members include the use of at least one shock absorber, and said chain stay members are pivotally connected to said main frame member in order to assist in isolating the rider from road shock.

* * * * *